Sept. 19, 1944.   L. G. HOWELL   2,358,574
GAMMA RAY WELL LOGGING
Filed July 8, 1940

Lynn G. Howell INVENTOR.
BY P. J. Whelan
ATTORNEY.

Patented Sept. 19, 1944

2,358,574

UNITED STATES PATENT OFFICE 2,358,574

GAMMA RAY WELL LOGGING

Lynn G. Howell, Houston, Tex., assignor to Standard Oil Development Company, a corporation of Delaware Application July 8, 1940, Serial No. 344,361

18 Claims. (Cl. 250—83.6)

The present invention is directed to a method for logging bore holes by measurement of the radioactivity of geologic layers traversed by the bore hole, either before or after the casing is set. It is particularly directed to an apparatus for carrying out this method.

In my copending application Serial No. 224,504, filed August 12, 1938, and entitled Radioactive well logging of which the present application is a continuation in part, I have described in general terms an apparatus for well logging involving a D. C. circuit and an A. C. amplifier including the use of an A. C. amplifier connected with the radioactive sensitive element through an electrometer tube, the grid of which is grounded at regular intervals by means of a clock work whereby pulses are produced which are proportional to the intensities of gamma rays and are amplified. In said application it was pointed out that with this arrangement drift trouble and other difficulties due to the high resistance in the circuit which require extremely well made and insulated cable connections are eliminated.

The principal object in the present invention is the provision of an apparatus suitable for gamma ray well logging which requires only a single conductor in the cable used for lowering the apparatus into a bore hole, and which is provided with means for converting the D. C. output of an ionization chamber into impulses of any desired frequency.

Figure 1:
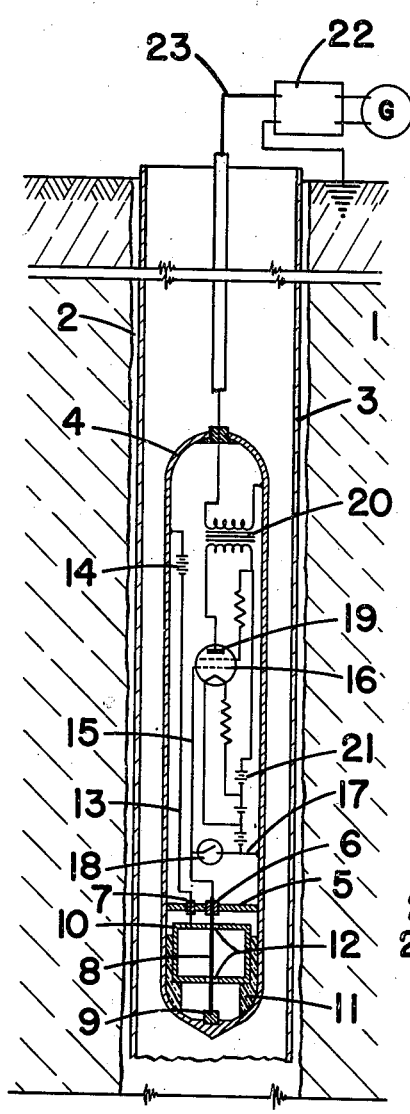
Figure 2:
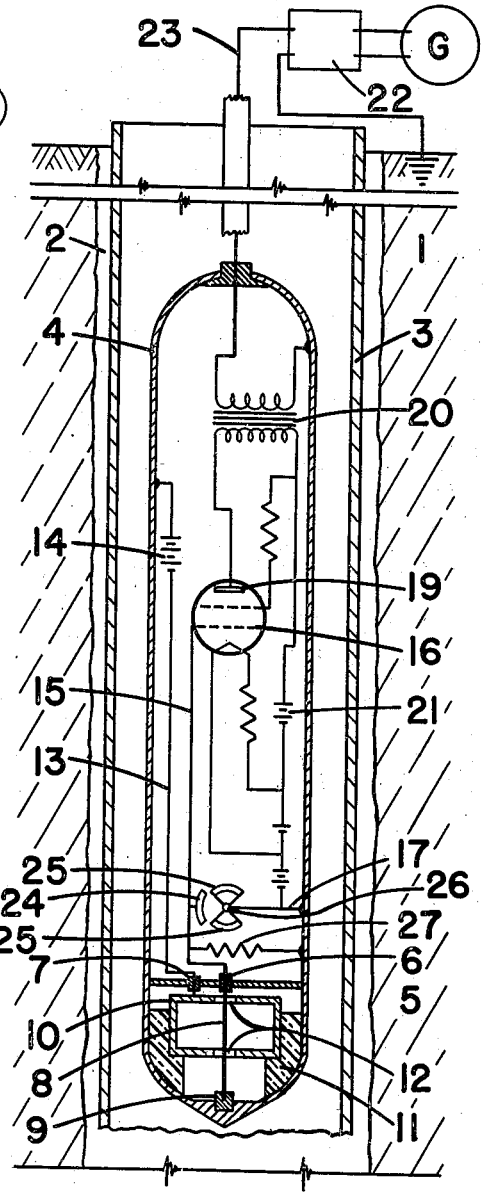

The present invention will be better understood from the following detailed description of the accompanying drawing in which Fig. 1 is a vertical section of one embodiment of an apparatus according to the present invention, and Fig. 2 is a similar section of a modified form of apparatus according to the present invention.

Referring to Fig. 1 of the drawing in detail, numeral 1 designates the earth, penetrated by a bore hole 2 which is lined with casing 3. Suspended in the bore hole is a chamber 4 made of steel of sufficient thickness to withstand the pressures encountered. Spaced from the lower end of the chamber is a transverse partition 5 made of steel capable of withstanding high pressure. This partition is provided with openings in which are set insulating blocks 6 and 7. Through insulating block 6 is arranged a rod or wire 8, the lower end of which is held by a second insulating block 7. This rod or wire constitutes the central electrode of an ionization chamber 10 which is held in place in the lower end of chamber 4 by insulating material 11, and in which are cutaway central portions 12 to provide a spacing between the rod or wire and the wall of the ionization chamber. Through insulating block 7 is a wire 13 connected to one end of a battery 14 the other terminal of which is grounded. This battery serves to impress a potential on the ionization chamber 10 which constitutes the outer electrode with respect to the wire 8. The wire 8 is connected by a conductor 15 to the grid 16 of an electrometer tube. Wire 15 is also connected to the ground by a wire 17 in which is a switch 18 operated by a clock work (not shown) which closes the switch at any selected frequency.

The plate 19 of the electrometer tube is connected to one winding of a transformer 20, the other terminal of which is connected to the usual batteries 21. The remaining parts of the electrometer tube are conventional and need not be described.

The other winding of the transformer 20 has one of its terminals grounded to casing 4 and the other terminal connected to an A. C. amplifier 22 through a conductor 23 which is carried in a cable which bears the weight of the chamber 4 and which is mounted on a drum at the surface in the usual manner in well logging. The winding of the transformer which is connected to the amplifier has a low impedance to match the impedance of the cable conductor to reduce or eliminate line losses.

The A. C. amplifier is preferably arranged at the surface. It could be arranged in the chamber 4, but such an arrangement would be unwieldy and would offer no advantage over arranging the amplifier at the surface. The amplifier is a conventional A. C. amplifier. It will be understood, of course, that the input transformer has a low impedance to match that of the winding of transformer 20 to which it is connected. The output of the amplifier is fed to a galvanometer selected so as to be responsive to the frequencies employed. Preferably, this galvanometer is a recording mirror galvanometer.

In the use of the apparatus above described, a voltage of at least 100 volts is impressed on the ionization chamber 10 so as to set up a potential difference between the chamber and the rod or wire 8. The space around the ionization chamber below the partition 5 is filled with a gas at a suitable pressure. Various gases can be used for this purpose, among the most common being nitrogen and argon. When nitrogen is employed, a suitable pressure to be maintained is about 500 pounds per square inch.

It will be understood that this pressure will vary with the gas selected for a given sensitivity of the device. The various gases which may be employed and the pressures which are best suited with these gases are fully described in the literature on ionization chambers.

When the chamber is lowered in the bore hole, the gamma rays given off by the formations will penetrate the chamber 4 and ionize the gas in the ionization chamber by secondary effects. The ionized gas places a charge on the wire or rod 8 which, in turn, sets up a current flowing through conductor 15 which builds up a voltage on the grid of the electrometer tube. When the grid is suddenly grounded by the closing of switch 18, the sudden change in grid potential causes a pulse of current in the plate circuit of the tube. This pulse passes through one winding of transformer 20 and induces a current in the other winding which is transmitted to the amplifier. The frequency of these pulses is determined by the clock work which operates switch 18 and, for any given frequency, the amplitude of the current pulse is determined by the ionization current generated in the ionization chamber which, in turn, is proportional to the number of gamma rays penetrating the chamber.

The frequency of the pulses can be selected from a fairly wide range. It is, of course, desirable to have as many pulses per foot of travel of the electrode as possible. With an electrode speed of 120 feet a minute a frequency of 60 pulses a minute is suitable, but preferably should be higher. A frequency of 20 pulses per minute is satisfactory with slow electrode speeds. In general, it may be said that the frequency can be from 10 to 120 pulses per minute, depending upon the rate of travel of electrode speed. With real slow frequencies, a suitable log may be prepared by stopping the electrode every few feet while the pulses are being produced.

In the embodiment shown in Fig. 2 corresponding parts are indicated by the same numerals. The embodiment shown in Fig. 2 differs from that shown in Fig. 1 in that the clock work switch 18 of Fig. 1 is replaced by a device for changing the capacity of the grid circuit such that there are periodic drops in voltage on the grid with a resultant generation of impulses in the plate circuit. To this end the clock operated switch 18 is replaced by a stationary condenser plate 24 which is so fixed and shaped as to coact with correspondingly formed plates 25 carried on a shaft 26 which is driven by a suitable electric motor (not shown) to form a condenser of periodically varying capacity. The motor is necessarily small and may be driven by batteries although, if desired, D. C. current can be fed to the motor through conductor 23 without interfering with the impulses that are fed by this conductor to the amplifier 22. The plates 25 are connected to the ground by conductor 17. Also arranged in parallel with the condenser is a resistance 27 connecting conductor 15 to the ground.

In operation, as each plate 25 passes plate 24 the resulting condenser picks up a charge which is supplied by the voltage across resistance 27 and thus reduces the voltage across 27. When the plates are in the position shown in the drawing, the voltage across 27 builds up again. The result is that the rotation of the plates 25 causes pulsations in the grid circuit which will be of a magnitude corresponding to the current in the ionization chamber. Such pulsations in the grid circuit cause corresponding pulsations in the plate circuit, the output of which is conveyed to the amplifier 22 through transformer 20.

It will be understood that, as is usual in well logging systems, the recording means at the surface will be so designed as to record the gamma-ray indications with relation to depth. This may be done by recording depth simultaneously with the gamma-ray intensity on a strip of sensitized paper (see Patent 2,156,052, issued April 25, 1939, to Cooper). It may be done by having a visual depth recorder at the surface from which the depth measurements may be taken from time to time and noted on the record of the significant measurement (see Patent 2,159,418, issued May 23, 1939, to E. Babcock). A more conventional method is to utilize a sensitized strip of paper carrying depth notations and moving this sensitized strip in front of the galvanometer in synchronism with the movement of the electrode in the borehole. In Patent 2,038,046, issued April 21, 1936, to J. J. Jakosky. This is done by the use of a sprocket reel for controlling the movement of the record strip driven by the electrode-carrying cable. In practice it is usually done by utilizing Selsyn motors to synchronize the movement of the sensitized strip with the electrode, one of the motors being connected with the measuring wheel at the surface, and the other being used to drive the winding reel in a camera.

The nature and objects of the present invention having been thus described and illustrated, what is claimed as being new and useful and is desired to be secured by Letters Patent is:

1. A method for producing a log of the gamma ray activity of formations penetrated by a bore hole which comprises moving along the bore hole an ionization chamber capable of generating current in response to gamma ray bombardment, of a size proportional to the gamma ray intensity, converting said current into a pulsating current of an amplitude proportional to the gamma ray intensity and of a selected frequency wholly independent of gamma ray intensity, transmitting said pulsating current to the surface, amplifying it, and recording it.

2. An apparatus for producing a log of the gamma ray activity of formations penetrated by a bore hole comprising a bomb adapted to be lowered into the bore hole, an ionization chamber in said bomb, means in said bomb for converting the output of the ionization chamber into pulses of a size proportional to the gamma ray intensity to which the ionization chamber is subjected, and means for conducting said pulses to the surface.

3. An apparatus according to claim 2 in which there is provided in the bomb means for controlling the frequency of the pulses independently of the gamma ray intensity.

4. An apparatus according to claim 2 in which the bomb is connected to the surface by a cable carrying a single conductor.

5. A method of obtaining geophysical data that comprises impressing a constant potential across spaced electrodes in an atmosphere of inert gas under superatmospheric pressure, continuously lowering said electrodes into an opening in the earth, obtaining from the electrode circuit a periodically interrupted electrical output current the voltage of which corresponds to the current flow in the electrode circuit altered by radiation from surrounding strata, amplifying said interrupted current, continuously recording the amplified current, continuously measuring the depth at which the electrodes are positioned in the earth, and continuously recording said measurements in correlation with the record of said current.

6. A method of obtaining geophysical data that comprises impressing a potential across spaced electrodes in an atmosphere of inert gas to generate current flow proportional to radiation from surrounding strata, positioning said electrodes below the surface of the earth, generating a pulsating current of greater magnitude than the current in the electrode circuit but controlled by the current in the electrode circuit so as to vary in accordance therewith, transmitting said pulsating current to the surface of the earth, ascertaining the depth at which the electrodes are positioned and recording in correlation the magnitude of the pulsating current and the depth of the electrodes.

7. A method of obtaining geophysical data that comprises impressing a potential across spaced electrodes in an atmosphere of inert gas, positioning said electrodes below the surface of the earth, obtaining from the electrode circuit a periodically interrupted electrical output current the voltage of which corresponds to the current flow in electrode circuit but which is altered by radiation from surrounding strata, amplifying said interrupted current, recording the amplified current, ascertaining the position of the electrodes and recording their position in correlation with the record of the amplified current.

8. A method of obtaining geophysical data that comprises impressing a constant potential across spaced electrodes in an atmosphere of inert gas under superatmospheric pressure, lowering said electrodes to various depths into an opening in the earth, obtaining from the electrode circuit a periodically interrupted electrical output current the voltage of which corresponds to the current flow in the electrode circuit but which is altered by radiation from surrounding strata, amplifying said interrupted current, recording the amplified current, measuring the depths to which said electrodes are lowered into the earth and recording said measurements in correlation with said current recordings.

9. An apparatus for geophysical exploration that comprises a casing adapted to be lowered into an opening in the earth, an ionization chamber in said casing including a pair of spaced electrodes and an inert gas under superatmospheric pressure, means to supply a potential across the electrodes to cause a current flow in a closed circuit including said electrodes, means for converting said current to a pulsating current, means for amplifying said pulsating current, means for measuring the depth to which the casing is lowered into the opening and means for recording in correlation the depth of the casing in the opening and the output of the amplifier.

10. A method of geophysical exploration comprising continuously moving spaced differentially charged electrodes in the vicinity to be explored, deriving from the electrodes a periodically interrupted current modified by radiation from surrounding strata, converting the interrupted current to a continuously uniformly pulsating signal, continuously amplifying the signal current, and continuously recording the amplified signal current in correlation with measurements of the locality of observation.

11. In combination with a device for obtaining geophysical data of the type including an ionization chamber capable of delivering a continuous current sensitive to radiations impinging thereon in a closed circuit including said chamber, of the improvements which comprise a converter for receiving the current from the ionization chamber and changing the same to a pulsating signal of uniform frequency, an amplifier for increasing the magnitude of the pulsating signal, and recording means operated by the amplifier for corrrelating the pulsating signal with measurements of the location at which the observation was made.

12. A method of measuring radiations due to nuclear disintegrations in a drill hole comprising producing pulsating electrical currents at various depths in the said hole, the magnitude of the said currents representing the intensity of said radiations at the corresponding depths, amplifying said currents, ascertaining the depths at which said currents are produced, and recording in correlation the magnitudes of the said amplified currents and the corresponding depths.

13. The method of determining the nature of geological formations traversed by a drill hole which comprises exposing an ionizable medium to radiations due to nuclear disintegrations, the said radiations being transmitted from the formations at different depths inside the drill hole, to thereby ionize said medium, utilizing the electrical reaction of said ionizable medium to said radiations to produce a pulsating current the magnitude of which represents the magnitude of the ionization of the said medium, amplifying said pulsating current, measuring the depths at which said ionizable medium is exposed and recording in correlation the magnitudes of the said amplified currents and the corresponding depths.

14. The method of determining the nature of geological formations traversed by a drill hole which comprises moving an enclosed body of a gas through a drill hole, exposing said body of gas to radiations due to nuclear disintegrations and derived from said formations at different depths inside the drill hole to thereby ionize said gas and to produce a current flow the magnitude of which represents the magnitude of ionization of the said gas, converting said current into a pulsating signal, amplifying said signal, and measuring the magnitude of the amplified signal to produce an index of intensity of said radiations encountered at said different depths inside said drill hole.

15. The method of geophysical exploration comprising receiving in a drill hole radiations caused by nuclear disintegrations, the said radiations being transmitted from a limited volume of the formations located at determined depths and adjacent the said drill hole, translating the said radiations into a pulsating electrical current, the magnitude of the said current corresponding to the intensity of the said radiations, amplifying said current, measuring the magnitude of the amplified current as an index of the strength of the said radiations, repeating said measurements for various other depths of the drill hole and comparing the resulting measurements to thereby determine the variation of the measured radiations with the depths of the drill hole as an index of the varying character of the strata traversed by the drill hole.

16. The method of determining the nature of geological formations traversed by a drill hole comprising moving a detector of radioactivity through the drill hole to expose said detector to radiations caused by radioactive processes and transmitted by said formations, translating the said radiations into pulsating currents, amplifying said currents, measuring the magnitude of the said currents corresponding to different depths inside the drill hole and comparing the resulting measurements to provide an index of the varying character of the different formations encountered.

17. Apparatus adapted for use in the logging of various geological formations traversed by a drill hole including a sealed casing, an ionization chamber within the casing, the said ionization chamber being adapted to be exposed to radiations caused by nuclear disintegrations, the said radiations being transmitted from the formations at various depths in the drill hole, means associated with said ionization chamber for producing a pulsating electrical current when the ionization chamber is exposed to said radiations, means for amplifying said current, means for recording the magnitude of the amplified current and means for moving the said casing in the drill hole past said formations.

18. A method of obtaining geophysical data that comprises impressing a constant potential across spaced electrodes in an atmosphere of enclosed gas, continuously lowering said electrodes into an opening in the earth, obtaining from the electrode circuit a pulsating electrical output current the magnitude of which corresponds to the current flow in the electrode circuit altered by radiations from surrounding strata, amplifying said pulsating current, continuously recording the amplified current, continuously measuring the depth at which the electrodes are positioned in the earth, and continuously recording said measurements in correlation with the record of said current.

LYNN G. HOWELL.